(12) United States Patent
Huang et al.

(10) Patent No.: US 12,517,039 B2
(45) Date of Patent: Jan. 6, 2026

(54) SYSTEM AND METHODS FOR GAS SPECTROSCOPIC SENSING WITH PHOTON COUNTING AND TUNABLE INTEGRATED PHOTONIC FILTERS

(71) Applicant: THE TRUSTEES OF THE STEVENS INSTITUTE OF TECHNOLOGY, Hoboken, NJ (US)

(72) Inventors: Yuping Huang, Norwood, NJ (US); Yong Meng Sua, Fort Lee, NJ (US); Jiuyi Zhang, Palisades Park, NJ (US); Jiayang Chen, Jersey City, NJ (US); Jeevanandha Ramanathan, Jersey City, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 268 days.

(21) Appl. No.: 17/944,965

(22) Filed: Sep. 14, 2022

(65) Prior Publication Data

US 2023/0079367 A1   Mar. 16, 2023

Related U.S. Application Data

(60) Provisional application No. 63/244,160, filed on Sep. 14, 2021.

(51) Int. Cl.
  *G01N 21/31* (2006.01)
  *G01N 33/00* (2006.01)
  *G02B 6/293* (2006.01)
(52) U.S. Cl.
  CPC ......... *G01N 21/31* (2013.01); *G01N 33/0027* (2013.01); *G02B 6/29338* (2013.01);
  (Continued)

(58) Field of Classification Search
  CPC ............ G02B 6/29338; G02B 6/29383; G02B 6/29395; G01N 21/31; G01N 33/0027;
  (Continued)

(56) References Cited

U.S. PATENT DOCUMENTS 5,850,285 A   12/1998   Hill et al.
6,480,265 B2   11/2002   Maimon et al.
(Continued)

FOREIGN PATENT DOCUMENTS

CA   2386884 C   *   2/2010   ............. G01N 21/39
CN   107070651 A1   11/2006
(Continued)

OTHER PUBLICATIONS

R. Cheriton, S. Sivanandam, A. Densmore, E. Mooij, D. Melati, M. Dezfouli, P. Cheben, D. Xu, J. Schmid, J. Lapointe, R. Ma, S. Wang, L. Simard, and S. Janz, "Spectrum-free integrated photonic remote molecular identification and sensing," Opt. Express 28, 27951-27965 (2020). (Year: 2020).*

(Continued)

*Primary Examiner* — Dominic J Bologna
*Assistant Examiner* — Paul Schnase
(74) *Attorney, Agent, or Firm* — Clark Hill PLC; Ralph W. Selitto; John K. Kim

(57) ABSTRACT

A spectroscope using single-photon counters and a chip-integrated lithium niobate micro-ring filter to measure the atmospheric CO2 absorption spectrum passively is disclosed. By thermo-optically sweeping the filter over 150 pm and referencing the resulting photon counts to a bypass channel, the absorption spectrum can be sampled at an ultrahigh-resolution of 6 pm. The spectroscope can be a part of a ground-based field system, wherein the CO2 absorption through the atmosphere can be characterized by counting the solar photons across the absorption line around 1572.02 nm, (Continued)

which agrees well with its transmission spectrum at standard atmospheric pressure.

9 Claims, 16 Drawing Sheets

(52) U.S. Cl.
CPC ..... *G02B 6/29383* (2013.01); *G02B 6/29395* (2013.01); *G01N 2201/06113* (2013.01); *G01N 2201/08* (2013.01)

(58) Field of Classification Search
CPC ............ G01N 2201/08; G01N 21/255; G01N 21/3504; G01N 2021/3531; G02F 1/0147
See application file for complete search history.

(56) References Cited

U.S. PATENT DOCUMENTS

| | | |
|---|---|---|
| 6,483,592 B2 | 11/2002 | Pedigo |
| 7,567,596 B2 | 7/2009 | Dantus et al. |
| 8,072,609 B1 | 12/2011 | Trivedi et al. |
| 8,309,929 B2 | 11/2012 | Bond et al. |
| 8,339,581 B2 | 12/2012 | Guha et al. |
| 8,621,931 B2 | 1/2014 | Phua et al. |
| 8,665,923 B2 | 3/2014 | Sprangle et al. |
| 8,761,606 B2 | 6/2014 | Habif |
| 9,596,421 B1 | 3/2017 | Itzler |
| 9,696,133 B2 | 7/2017 | Yuan et al. |
| 9,945,948 B2 | 4/2018 | Yang et al. |
| 10,860,746 B2 | 12/2020 | Foster et al. |
| 11,003,046 B2 | 5/2021 | Liscidini |
| 11,264,775 B2 | 3/2022 | Huang |
| 11,442,697 B2 | 9/2022 | Huang et al. |
| 2002/0097962 A1 | 7/2002 | Yoshimura et al. |
| 2004/0136634 A1 | 7/2004 | Chowdhury et al. |
| 2005/0123242 A1 | 6/2005 | Walker |
| 2006/0083379 A1 | 4/2006 | Brookner |
| 2006/0245680 A1 | 11/2006 | Rasmussen et al. |
| 2008/0138087 A1 | 6/2008 | Snyder |
| 2009/0046296 A1 | 2/2009 | Kilpatrick et al. |
| 2010/0124787 A1 | 5/2010 | Nitkowski et al. |
| 2013/0036145 A1 | 2/2013 | Pruneri |
| 2014/0098955 A1 | 4/2014 | Hughes |
| 2014/0192363 A1 | 7/2014 | Kippenberg et al. |
| 2015/0323450 A1 | 11/2015 | Lipson et al. |
| 2016/0234017 A1 | 8/2016 | Englund |
| 2017/0131388 A1 | 5/2017 | Campbell et al. |
| 2018/0241480 A1 | 8/2018 | Hughes |
| 2020/0257502 A1 | 8/2020 | Steinle |
| 2020/0274703 A1 | 8/2020 | Lukens |
| 2020/0285131 A1* | 9/2020 | Marandi ............... G02F 1/39 |
| 2021/0080805 A1 | 3/2021 | Srinivasan et al. |
| 2021/0156684 A1 | 5/2021 | Huang |
| 2021/0247662 A1 | 8/2021 | Dorche et al. |
| 2022/0075238 A1 | 3/2022 | Huang et al. |
| 2023/0155823 A1 | 5/2023 | Huang et al. |
| 2023/0168563 A1 | 6/2023 | Huang et al. |
| 2023/0366735 A1* | 11/2023 | Gonzalez ............. G01J 3/0297 |

FOREIGN PATENT DOCUMENTS

| | | | |
|---|---|---|---|
| CN | 107528686 A | 12/2017 | |
| CN | 111897054 A | 11/2020 | |
| EP | 3477362 A1 | 6/2019 | |
| EP | 3286603 B1 | 2/2020 | |
| GB | 2510916 A | 4/2015 | |
| JP | 4091956 B2 | 5/2008 | |
| KR | 101899026 B1 | 10/2018 | |
| WO | WO-9425851 A1 * | 11/1994 | ......... G01N 21/6408 |
| WO | 2013112351 A2 | 8/2013 | |
| WO | 2018031916 A1 | 2/2018 | |
| WO | WO-2020084466 A1 * | 4/2020 | ............ G01J 3/0256 |
| WO | 2019241582 A1 | 6/2020 | |
| WO | WO2021226395 A1 | 11/2021 | |
| WO | WO2021231794 A1 | 11/2021 | |
| WO | WO2023004148 A1 | 1/2023 | |

OTHER PUBLICATIONS

Park, H.-J.; Park, J.-S.; Kim, S.-W.; Chong, H.; Lee, H.; Kim, H.; Ahn, J.-Y.; Kim, D.-G.; Kim, J.; Park, S.S. Retrieval of NO2 Column Amounts from Ground-Based Hyperspectral Imaging Sensor Measurements. Remote Sens. 2019, 11, 3005. https://doi.org/10.3390/rs11243005 (Year: 2019).*
Thorlabs—In-Line Fiber Optic Polarizers. Thorlabs online product catalogue. Archived Oct. 7, 2012. (Year: 2012).*
J. Zhang, Y. M. Sua, J. Chen, J. Ramanathan, C. Tang, Y. Hu, and Y. Huang, "Atmospheric Carbon Dioxide Absorption Measurement using Integrated Lithium Niobate Nanophotonics," in Conference on Lasers and Electro-Optics. (Year: 2021).*
U R. Cheriton, S. Sivanandam, A. Densmore, E. Mooij, D. Melati, M. Dezfouli, P. Cheben, D. Xu, J. Schmid, J. Lapointe, R. Ma, S. Wang, L. Simard, and S. Janz, "Spectrum-free integrated photonic remote molecular identification and sensing," Opt. Express 28, 27951-27965 (2020). (Year: 2020).*
Jason Lin et al., "Quantum private comparison of equality protocol without a third party", arxiv. org, vol. 13, No. 2, Oct. 1, 2013, pp. 239-247.
Goorden, Sebastianus & Horstmann, Marcel & Mosk, Allard & Skoric, Boris & Pinkse, Pepijn. (2013). Quantum-Secure Authentication with a Classical Key.
Arapinis et al. "Quantum Physical Unclonable Functions: Possibilities and Impossibilities." Jun. 15, 2022, Quantum 5, 475 (2021). arXiv:1910.02126v4.
F. Xu, Experimental fast quantum random number generation using high-dimensional entanglement with entropy monitoring, Optica 3, 1266-1269 (2016).
Hochrainer, Low-Loss Optical Elements for a Loophole-Free Bell Test, 2014 (Thesis).
Lee, H., Chen, T., Li, J et al. Ultra-low-loss optical delay line on a silicon chip. Nat Commun 3, 867 (2012). https://doi.org/10.1038/ncomms1876.
Fiorentino, Marco & Munro, William & Santori, Charles & Spillane, Sean & Beausoleil, Ray. (2006). All-Fiber-Optic Quantum Random Number Generator. 1-2. 10.1109/CLEO.2006.4628717.
Nguyen L, Rehain P, Sua YM, Huang YP. Programmable quantum random No. generator without postprocessing. Opt Lett. Feb. 15, 2018;43(4):631-634. doi: 10.1364/OL.43.000631. PMID: 29444039.
Nguyen, Lac & Rehain, Patrick & Sua, Yong Meng & Huang, Yu-Ping. (2018). Quantum Random Number Generator with Programmable Probability Distributions. JTu3A.30. 10.1364/FIO.2018.JTu3A.30.
Kumar, S., Zhang, H. & Huang, YP. Large-scale Ising emulation with four body interaction and all-to-all connections. Commun Phys 3, 108 (2020). https://doi.org/10.1038/s42005-020-0376-5.
D. Pierangeli, G. Marcucci, and C. Conti, Large-Scale Photonic Ising Machine by Spatial Light Modulation. Phys. Rev. Lett. 122, 213902—Published May 31, 2019.
Roques-Carmes, C., Shen, Y., Zanoci, C et al. Heuristic recurrent algorithms for photonic Ising machines. Nat Commun 11, 249 (2020). https://doi.org/10.1038/s41467-019-14096-z.
Shahverdi A, Sua YM, Dickson I, Garikapati M, Huang YP. Mode selective up-conversion detection for LIDAR applications. Opt Express. Jun. 11, 2018;26(12):15914-15923. doi: 10.1364/OE.26.015914. PMID: 30114845.
Geiser, P., Willer, U., Walter, D., and Schade, W., "A subnanosecond pulsed laser-source for mid-infrared LIDAR", Applied Physics B: Lasers and Optics, vol. 83, No. 2, pp. 175-179, 2006. doi:10.1007/s00340-006-2158-5.
Shahverdi, Amin & Sua, Yong Meng & Tumeh, Lubna & Huang, Yu-Ping. (2017). Quantum Parametric Mode Sorting: Beating the Time-Frequency Filtering. Scientific Reports. 7. 10.1038/s41598-017-06564-7.

(56) References Cited

OTHER PUBLICATIONS

J. Lu, J. Surya, X. Liu, A. Bruch, Z. Gong, Y. Xu, and H. Tang, "Periodically poled thin-film lithium niobate microring resonators with a second-harmonic generation efficiency of 250,000%/W," Optica 6, 1455-1460 (2019).

Fu. Y., Guo, M., & Phua, P. B. (2010). Spatially encoded multibeam laser Doppler vibrometry using a single photodetector, Optics Letters, 35(9), 1356-1358.

Yanlu Li, Jinghao Zhu, Matthieu Duperron, Peter O'Brien, Ralf Schüler, Soren Aasmul, Mirko de Melis, Mathias Kersemans, and Roel Baets, "Six-beam homodyne laser Doppler vibrometry based on silicon photonics technology," Opt. Express 26, 3638-3645 (2018).

Patrick Rehain, Jeevanandha Ramanathan, Yong Meng Sua, Shenyu Zhu, Daniel Tafone, and Yu-Ping Huang, "Single-photon vibrometry," Opt. Lett. 46, 4346-4349 (2021).

Jiuyi Zhang, Yong Meng Sua, Jia-Yang Chen, Jeevanandha Ramanathan, Chao Tang, Zhan Li, Yongxiang Hu, Yu-Ping Huang; Carbon-dioxide absorption spectroscopy with solar photon counting and integrated lithium niobate micro-ring resonator. Appl. Phys. Lett. Apr. 26, 2021; 118 (17): 171103. https://doi.org/10.1063/5.0045869.

Tri Cao Doan, Resonant Matter Wave Amplification in Mean Field Theory, arXiv: 1112.3325v1 Quantum Gases, Dec. 14, 2011.

Hu, Yi & Siviloglou, Georgios & Zhang, Peng & Efremidis, Nikolaos & Christodoulides, Demetrios & Chen, Zhigang. (2012). Self-accelerating Airy Beams: Generation, Control, and Applications. 10.1007/978-1-4614-3538-9_1.

Yu-Ping Huang and Prem Kumar, "Mode-resolved photon counting via cascaded quantum frequency conversion," Opt. Lett. 38, 468-470 (2013).

Abijith S. Kowligy, Paritosh Manurkar, Neil V. Corzo, Vesselin G. Velev, Michael Silver, Ryan P. Scott, S. J. B. Yoo, Prem Kumar, Gregory S. Kanter, and Yu-Ping Huang, "Quantum optical arbitrary waveform manipulation and measurement in real time," Opt. Express 22, 27942-27957 (2014).

Jingle Liu, Jianming Dai, See Leang Chin, and X.-C. Zhang, "Broadband terahertz wave remote sensing using coherent manipulation of fluorescence from asymmetrically ionized gases," Nature Photonics, vol. 4, (Sep. 2010).

R. Sferopoulos, "A Review of Chemical Warfare Agent (CWA) Detector Technologies and Commercial-Off-The-Shelf Items," DSTO Defence Science and Technology Organisation, Fishermans Bend, Victoria, Australia (2009).

Huang, et al., "Heralding single photons without spectral factorability", Phys. Rev. A 82, 043826 (2010).

Seth Lloyd, "Enhanced Sensitivity of Photodetection via Quantum Illumination", Science 321, 1463-1465(2008), DOI:10.1126/science.1160627.

U.S. Appl. No. 17/899,493, filed Aug. 30, 2022, titled Approaches, Apparatuses, and Methods for Non-Interferometric Quantum Photonics Vibrometry. Yuping Huang et al.

* cited by examiner

FIG. 16

| PARAMETER | VALUE |
|---|---|
| CENTRAL WAVELENGTH | 1572.02 nm |
| SPECTRAL SAMPLING NUMBER | 20 |
| SAMPLING STEP SIZE | ≈8 pm (971.2 MHz) |
| OPTICAL RECEIVER DIAMETER | ≈2.5 cm |
| FILTER SPECTRAL WIDTH (FWHM) | ≈6 pm (728.4 MHz) |
| PHOTON COUNTING INTEGRATION TIME | 125 ms |
| ATMOSPHERIC $CO_2$ DETECTION SENSITIVITY | ≈1.2 ppm |
| SNSPD QUANTUM EFFICIENCY | ≈85% |
| SNSPD DARK COUNTS (SIGNAL AND REFERENCE) | ≈300 Hz |
| SNSPD COUNTING RATE WITHOUT SOLAR SIGNAL | 9.6–16 (kHz) |
| SNSPD COUNTING RATE PER SAMPLE (SIGNAL) | 112–256 (kHz) |
| SNSPD COUNTING RATE PER SAMPLE (REFERENCE) | 1.07–1.12 (MHz) |

SYSTEM AND METHODS FOR GAS SPECTROSCOPIC SENSING WITH PHOTON COUNTING AND TUNABLE INTEGRATED PHOTONIC FILTERS

CROSS-REFERENCE TO RELATED APPLICATION

This application claims priority to U.S. Provisional Patent Application Ser. No. 63/244,160 filed Sep. 14, 2021, the entire disclosure of which is incorporated herein by reference.

STATEMENT REGARDING FEDERALLY SPONSORED RESEARCH

This invention was made with government support under Grant No. 80NSSC19K1618 awarded by the National Aeronautics and Space Association (NASA). The U.S. government has certain rights in the invention.

FIELD OF THE INVENTION

The present invention relates to remote sensing systems with improved sensitivity at the single-photon level.

BACKGROUND OF THE INVENTION

Spectroscopic measurement and concentration dynamics tracking of atmospheric $CO_2$ gas are essential in many areas of environmental monitoring, atmospheric composition analysis, carbon cycle research, and satellite-based gas remote sensing as they are integral for assessment and search of technological countermeasures on global warming. Thus far, distributed in situ remote sensing stations on the ground and satellite-based observatories provide global measurement of greenhouse gases with a wide terrestrial coverage. To this end, active spectroscopic techniques such as differential absorption lidar (DIAL) and integrated path differential absorption lidar (IPDA), despite notable successes, require narrow linewidth lasers of high power or cavity-enhanced optical frequency comb sources with excellent wavelength stability that is locked to a reliable reference. They are thus less ideal for satellite missions or field deployment due to complicated experimental configurations, considerable operational instability, and restrictions in accessible wavelength range and sensing distance.

In contrast, passive spectroscopic techniques, with sufficient spectral resolution and high detection sensitivity, could empower both ground-based and space-borne atmospheric $CO_2$ column measurements with much less device demands and operation overhead. In those systems, however, conventional diffractive bulk-optics are subject to a trade-off among the instrument size, throughput, and spectral resolution. This interplay limits the system's end performance for space-borne applications where the device size, weight, and power (SWaP) are at a premium. Recently, photonic integrated circuits (PIC) have been gathering pace towards being the next-generation optical instrumentation in remote sensing, with substantially reduced SWaP yet boosted cost-effectiveness, while promising unparalleled performance over a diverse range of functionalities. Nevertheless, the high performance of PIC devices usually relies on diffraction-limited wave-guiding in the fundamental mode. Coupling inherently multimode sunlight into such devices is challenging, usually requiring adaptive optics to match the intensity distribution and phase front of the incident beam to the waveguide US patent U.S. Pat. No. 8,309,929B2 relates to tunable photonic cavities for in-situ spectroscopic trace gas detection. US patent US20150323450A1 involves implementation of an on-chip integrated gas sensor based on photonic sensing. Spectroscopy assemblies are known, such as those disclosed in US patent US20140192363A1. Cavity-enhanced on-chip absorption spectroscopy, as discussed in US patent US20100124787A1, has also seen experimentation.

However, none of these publications discloses passive spectroscopic measurement with single photon detection and photonic integrated circuits.

SUMMARY OF THE INVENTION

The present invention involves the combination of integrated photonic circuits (IPC) and single photon counting for a remote sensing system utilizing solar photons. The single photon sensitive, IPC-enhanced remote sensing technique can reduce the size, weight, power, and cost of implementing the remote sensing system, which combines the ultra-sensitivity of single photon counting and a narrow-band filter made of an integrated, fast swept micro-ring resonator for high-resolution measurement of the absorption spectra of atmospheric gases, aerosols in air, polluting smokes, leaked oil gases, and other vaporous targets of interest.

The present invention uses background (e.g., solar) photons to measure the gases' absorption spectra, without the need for active light sources, thus making the invention applicable over a wide range of wavelengths and over extended distances. The present invention only requires a minimal amount of detected photons for conclusive measurement. In some embodiments, the present invention may be fabricated with standard semiconductor processing processes on a monolithic lithium niobate platform, thus making it compatible with established large-scale silicon wafer processes for mass production with high yield and high reliability.

Remote sensing systems constructed in accordance with the present invention offer the following advantages: high detection sensitivity, fine resolution, and reduced size, weight, and power. In some embodiments, the present invention can be used for energy-efficient and reduced-size satellite-based remote gas sensing systems. In some embodiments, the present invention can be used to measure the atmosphere constituents of an unexplored space. In other embodiments, the present invention can be used for an energy-efficient and reduced-size satellite-based remote monitoring system of solar or laser induced fluorescence. In further embodiments, the present invention can be used for real-time, dynamic monitoring of gas concentrations.

In one embodiment, a passive spectroscope constructed in accordance with an embodiment of the present invention comprises an external multi-channel single-photon detector and a chip-integrated filter using an add-drop microring resonator (MRR) etched on lithium niobate on insulator (LNOI). LNOI is a rapid progressing platform for integrated photonics propelled by its excellent optical properties on many aspects. Notably, its outstanding electro-optic and efficient thermo-optic effects, wide transparent window ranging from ultraviolet (UV) to mid-infrared (mid-IR), and low propagation losses are ideal for the development of tunable narrow-linewidth MRR filters for sensing of various gas species With fast scanning, single-photon sensitive, high resolution, and ultralow detection noise, the present spectroscopy can prove useful for pervasive deployments in satellite, airborne, and wide-field missions.

The present invention can also see applications in the sensing of gas agents via passive measurement of signature absorption spectra, including green gas monitoring, oxygen concentration measurement, explosive object detection, gas leakage from pipes, vegetation health survey, and other small-satellite missions for remote sensing. Additionally, the devices and methods of the present invention dramatically reduce the device size in remote sensing systems utilizing photons with significantly improved sensitivity at single photon level and spectroscopy resolution. This in turn enables pervasive and frequent deployment at low cost and high efficiency. The present invention highlights the potential of adopting integrated photonics and single-photon counting in remote sensing systems for high detection sensitivity, superior resolution, and significantly reduced size, weight, and power.

A method for single-photon spectroscopy in accordance with the present invention can entail collecting photons using a beam expander into a collimated single-mode fiber, letting the photons pass through a long-pass filter to eliminate photons from other bands, and using a band-pass filter on the long-pass filtered photons to define a narrow spectral window in order to pick a single gas absorption line-shape and obtain filtered light. A fiber polarizer can then be utilized to select the filtered light along a certain polarization, thereby splitting the filtered and polarized light into two channels of photon counting to create a reference channel and a signal channel with the signal channel containing a calibrated micro-ring resonator filter before the photon counting. The resonance of the resonator filter can be utilized to sweep through the narrow spectral window, with a field-programmable-gate-array being employed to tune a center wavelength of the micro-ring resonator filter. Synchronized photon counting data can then be garnered from the reference channel and signal channel.

In an embodiment, a thermal tunable micro-ring resonator filter can be used that includes an add-drop micro-ring resonator and an integrated metal heater. The resonator filter can be etched on lithium niobate on insulator, and such a filter could further be implemented as part of a passive spectroscope that also includes an external multi-channel single-photon detector.

BRIEF DESCRIPTION OF THE DRAWINGS

For a more complete understanding of the present invention, reference is made to the following detailed description of various exemplary embodiments considered in conjunction with the accompanying drawings, in which:

FIG. 16 is a table of system parameters for a system constructed in accordance with an embodiment of the present invention.

DETAILED DESCRIPTION OF THE EXEMPLARY EMBODIMENTS

The following disclosure is presented to provide an illustration of the general principles of the present invention and is not meant to limit, in any way, the inventive concepts contained herein. Moreover, the particular features described in this section can be used in combination with the other described features in each of the multitude of possible permutations and combinations contained herein.

All terms defined herein should be afforded their broadest possible interpretation, including any implied meanings as dictated by a reading of the specification as well as any words that a person having skill in the art and/or a dictionary, treatise, or similar authority would assign thereto.

Further, it should be noted that, as recited herein, the singular forms "a", "an", "the", and "one" include the plural referents unless otherwise stated. Additionally, the terms "comprises" and "comprising" when used herein specify that certain features are present in that embodiment, however, this phrase should not be interpreted to preclude the presence or addition of additional steps, operations, features, components, and/or groups thereof.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
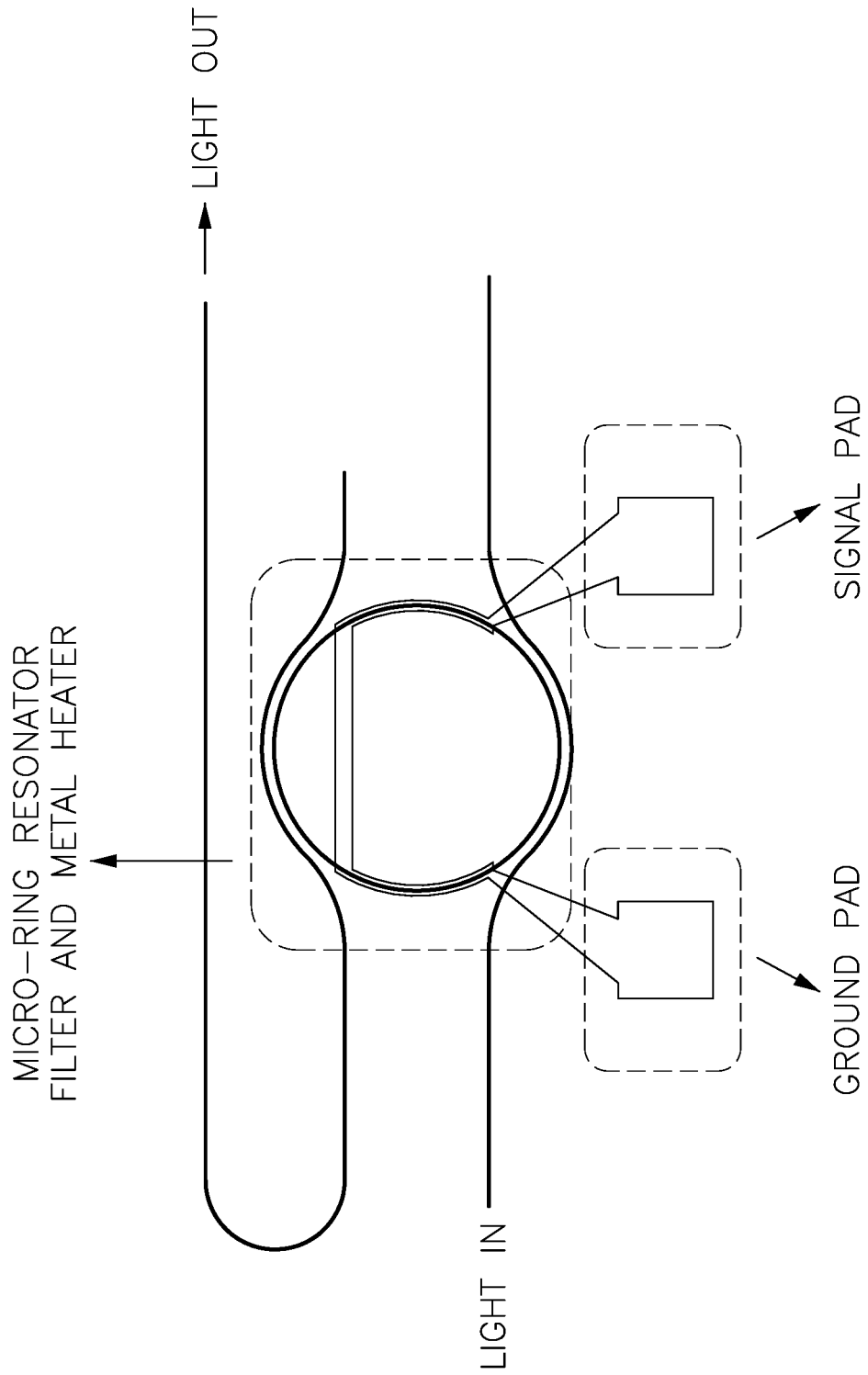
FIG. 1 shows a micro-ring resonator filter structure.

A thermal tunable micro-ring resonator (MRR) filter in accordance with an embodiment of the present invention is shown in FIG. 1. Such a resonator filter is based on the thermo-optical effect with an add-drop micro-ring resonator and integrated metal heater. The near inferred (NIR) laser or sunlight photons are coupled into the waveguide at the input port and coupled into the micro-ring resonator. The ultra-narrow transmittance bandwidth of the micro-ring resonator constitutes a high-performance optical filter. The refractive index of the micro-ring resonator can be increased when electric heating power is applied. With the tuning electric power of the integrated metal heater, the wavelength of the transmittance spectrum is therefore changed. This allows for the design of the filtering optical window.

Figure 2:
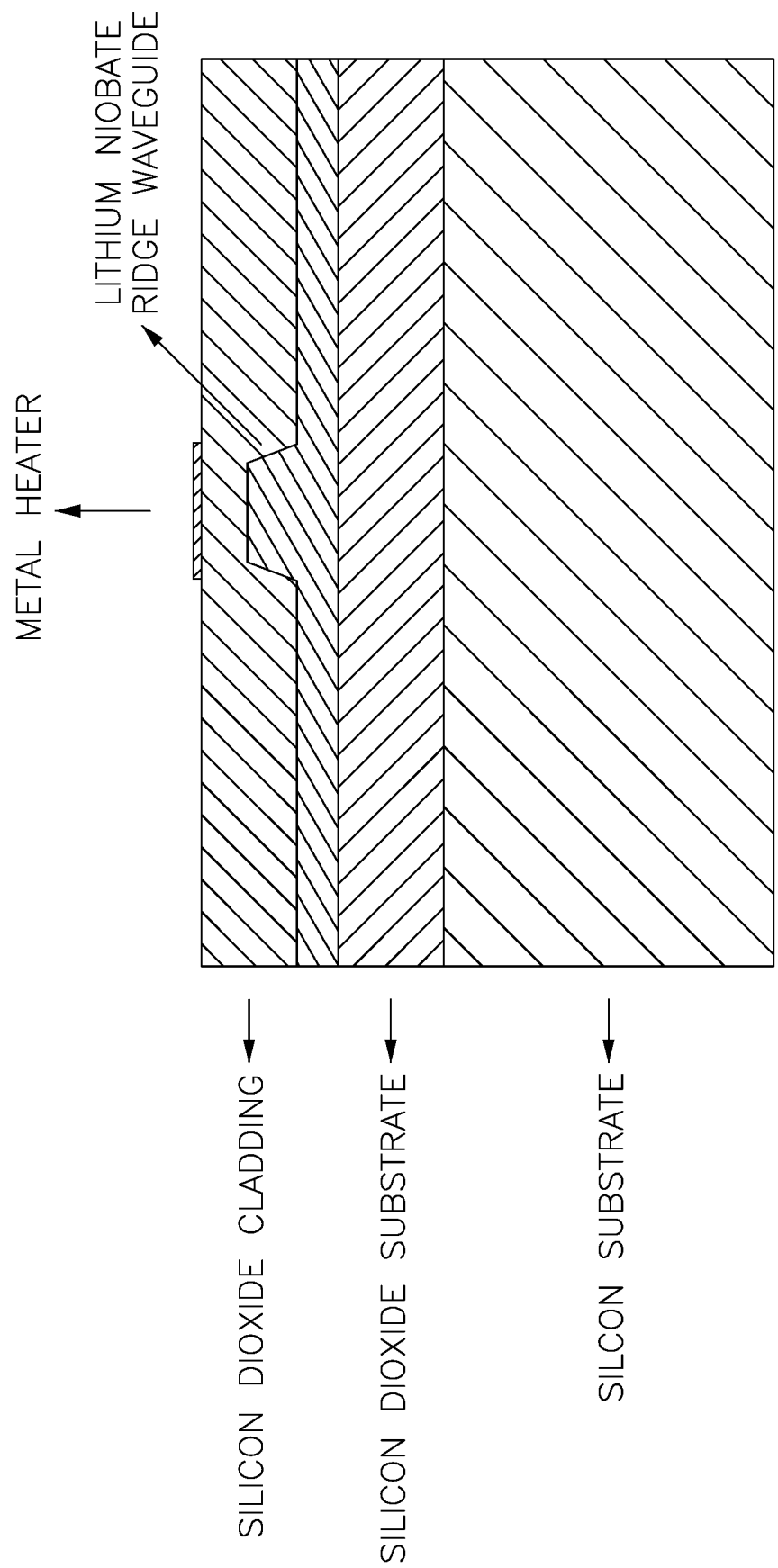
FIG. 2 shows a cross-section of a micro-ring resonator filter in a remote sensing system, which includes a waveguide surrounded by a SiO2 cladding layer and a platinum micro-heater deposited atop the cladding layer.
Figure 11:
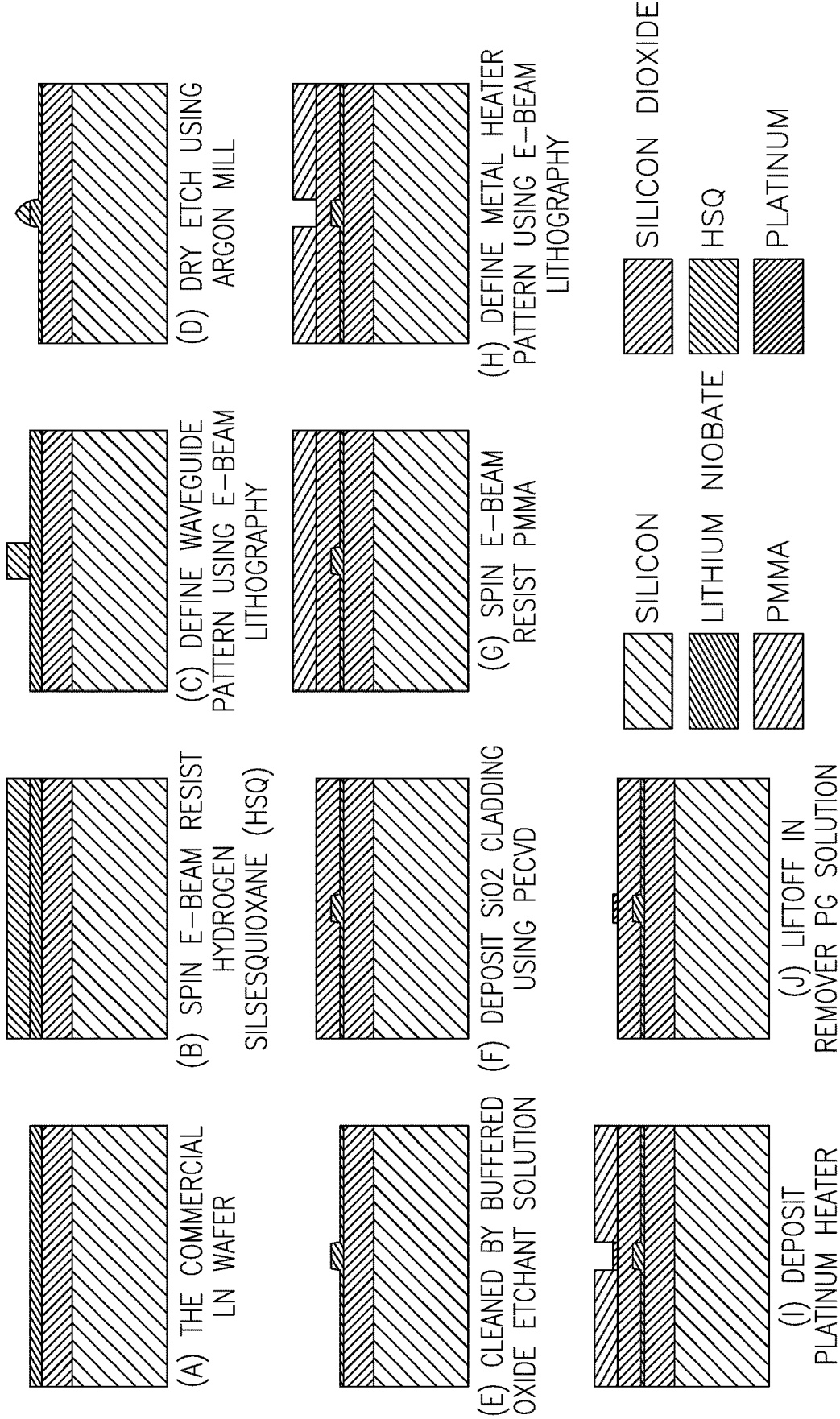
FIG. 11 is a flow-chart showing a fabrication procedure for the microring resonance filter of FIG. 1.
Figure 12:
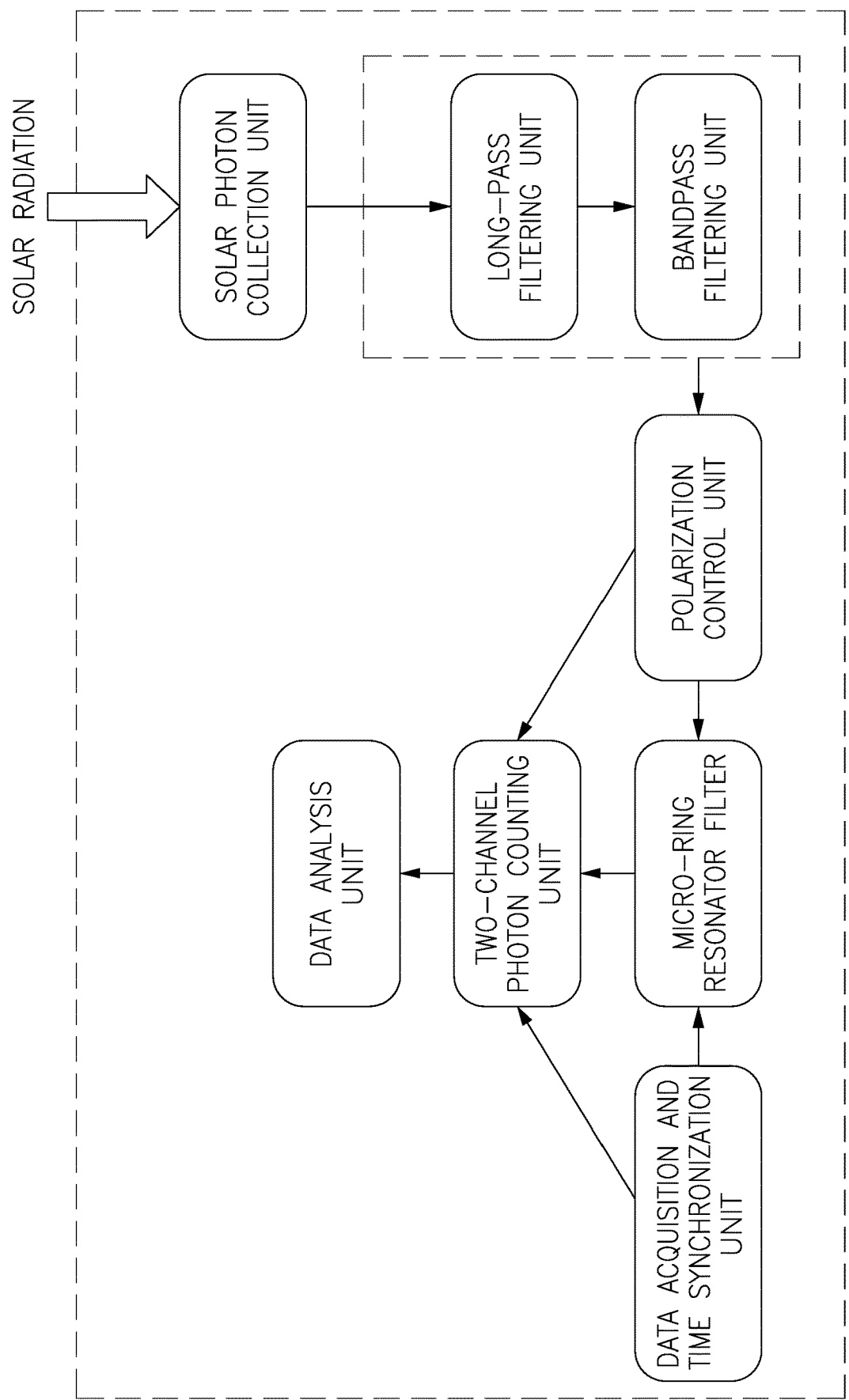
FIG. 12 is a system diagram for devices made in accordance with the present invention.

An add-drop micro-ring resonator filter with air cladding, etched from a commercial 600-nm thin film of X-cut Lithium Niobate (LiNbO3), as shown in FIG. 1, can be fabricated as illustrated in FIGS. 11 and 12. The thin film is shallowly etched by 350 nm for waveguiding while leaving a 250 nm slab across the chip to ensure a high-quality factor for achieving a narrow bandwidth filter, as shown in FIG. 2. Two pulley bus waveguides can be positioned on the two sides of the micro-ring resonator for input and drop. To singly excite the fundamental transverse electric (TE) mode in the Micro-ring resonator while suppressing all other guided modes, the top widths of the micro-ring resonator and waveguides can be 1500 nm and 1000 nm, respectively, designed so as to fulfill the phase-matching condition for the mode coupling. FIG. 2, more specifically, is the cross section of the micro-ring resonator filter. The lithium niobate micro-ring resonator filter chip includes multiple layers. In an embodiment, the bottom layer is a silicon substrate. The thin-film lithium niobate is 600 nm, with 350 nm shallowed etch and 250 nm remining. In between is a 4.7 um thick silicon dioxide substrate layer. Plasma-enhanced-chemical-vapor-deposition (PECVD) can be employed to make a 1.5 um thick silicon dioxide cladding on the top of the sample to protect the waveguides. Subsequently, a 100 nm thick platinum micro-heater can be deposited on the top of the micro-ring resonator.

Figure 4:
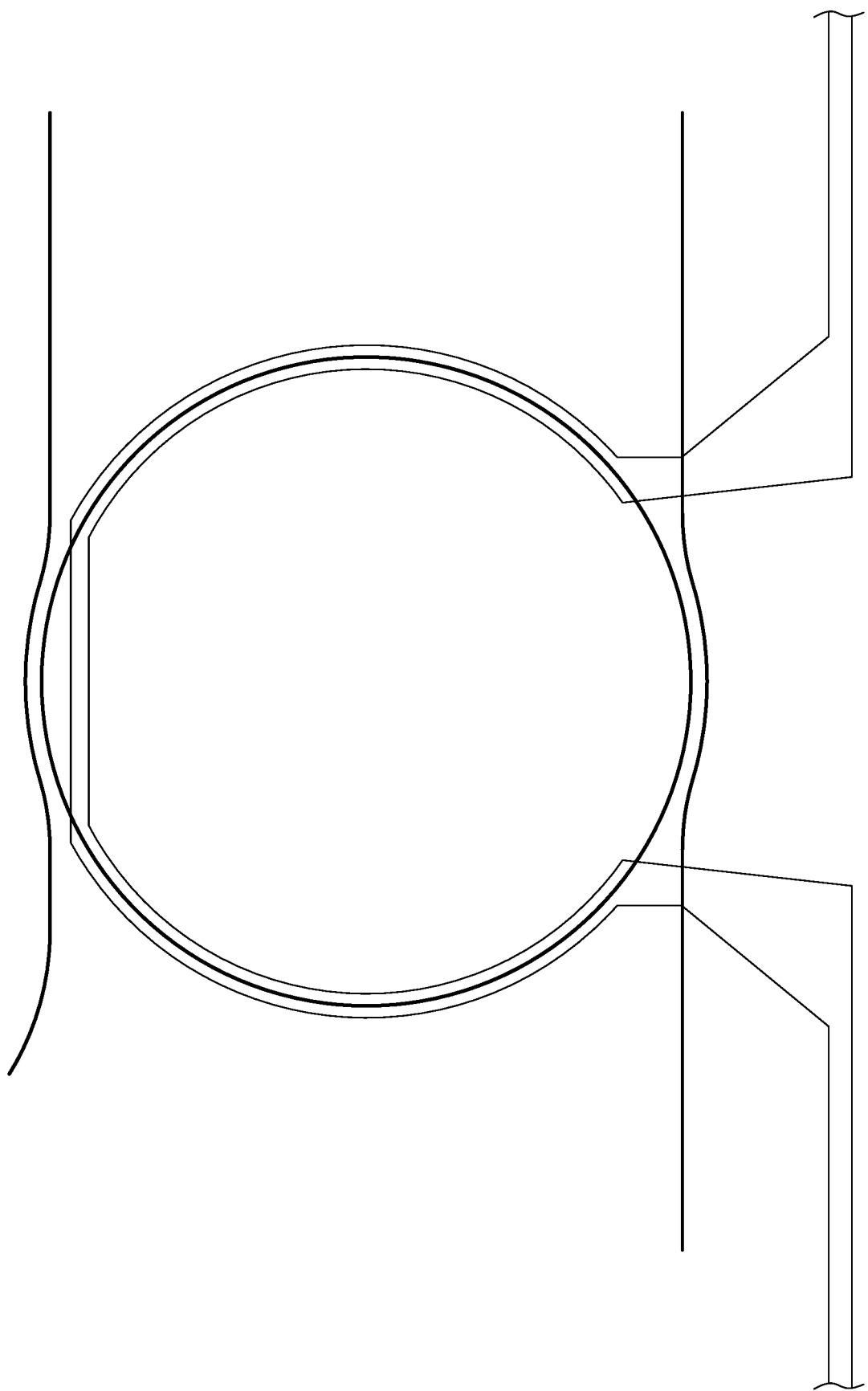
FIG. 4. is a microscope image of the MRR with a platinum micro-heater.

As an example of such proposed thermo-optical micro-ring resonator filters, a ridge waveguide with top height of 350 nm and base height of 250 nm may be employed, as shown in FIG. 4. The width of the waveguide is 1500 nm. The buried SiO2 layer is 4.7 um, and the cladding SiO2 layer is 1500 nm, as shown in FIG. 2. The electrodes may be placed on top of the waveguide cladding with 1 um width and 100 nm thickness. The radius of the micro-ring resonator filter and/or the integrated platinum heater can be 80 um. The signal is applied on one electrode, while the ground is applied on the other electrode, so that the electric power is created on the top of the waveguides and the refractive index change occurs due to the thermal-optical effect. Therefore, the resonance wavelength of the guided modes is changed, as shown in FIG. 1.

One consideration in the implementation of the present invention is balancing the on-chip mode coupling efficiency, narrow filtering bandwidth, thermal-optical stability, and high extinction ratio of the add-drop micro-ring resonator. In an embodiment, the over-coupled fundamental TE mode case can be used. In an exemplary embodiment, the end device has a transmittance spectrum of 6 pm bandwidth (full-width half-maximum, FWHM) and a 30 dB extinction ratio around 1572.02 nm, which is the targeted $CO_2$ absorption line, to minimize the interference from water vapor lines in the atmosphere (see FIG. 3). This wavelength choice has been demonstrated in air-borne atmospheric $CO_2$ remote sensing, as the differential—absorption cross-section by the water vapors at 1572.02 nm is more than four orders of magnitude smaller than that of $CO_2$.

Figure 3:
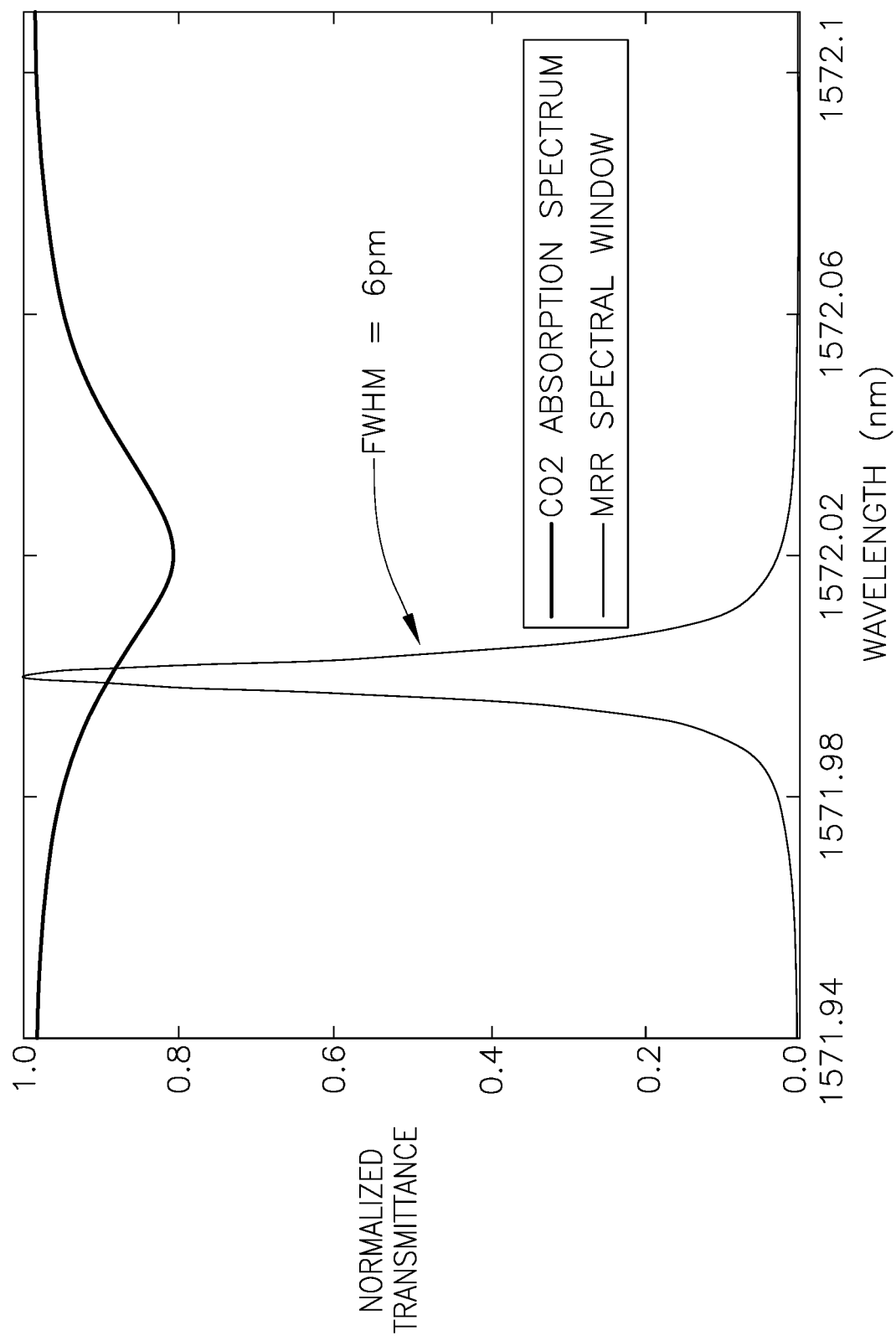
FIG. 3 is the transmission spectrum of the micro-ring filter and the CO2 gas cell absorption spectrum around 1572 nm.

The MRR filter calibration can be performed using a narrowband, tunable laser (Santec, TSL-550). The result is plotted in FIG. 3, showing a transmission FWHM of 6 pm. Also plotted in the same figure is the absorption spectrum of the fiber-coupled $CO_2$ gas cell, measured by the same laser, which shows an FWHM bandwidth around 50 μm. These data verify that the filter has adequately narrow bandwidth to measure the $CO_2$ absorption with high resolution by thermal-optical tuning.

Figure 5:
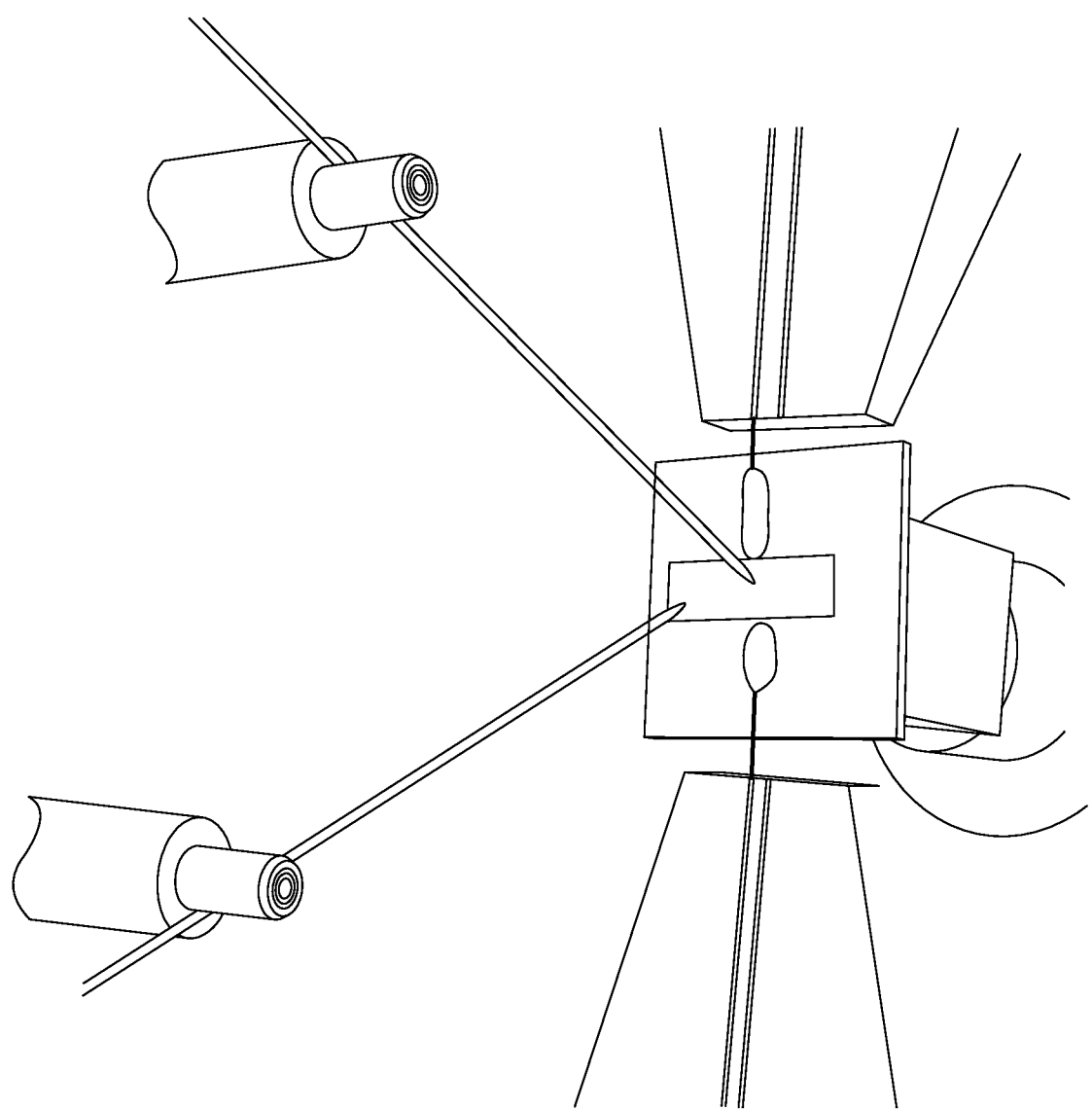
FIG. 5 is a photo showing the fiber packaged LNOI chip connected to electric probes, which includes an MRR filter chip using UV light exposed epoxy with a high numerical-aperture fiber to stabilize the on-off chip coupling.
Figure 6:
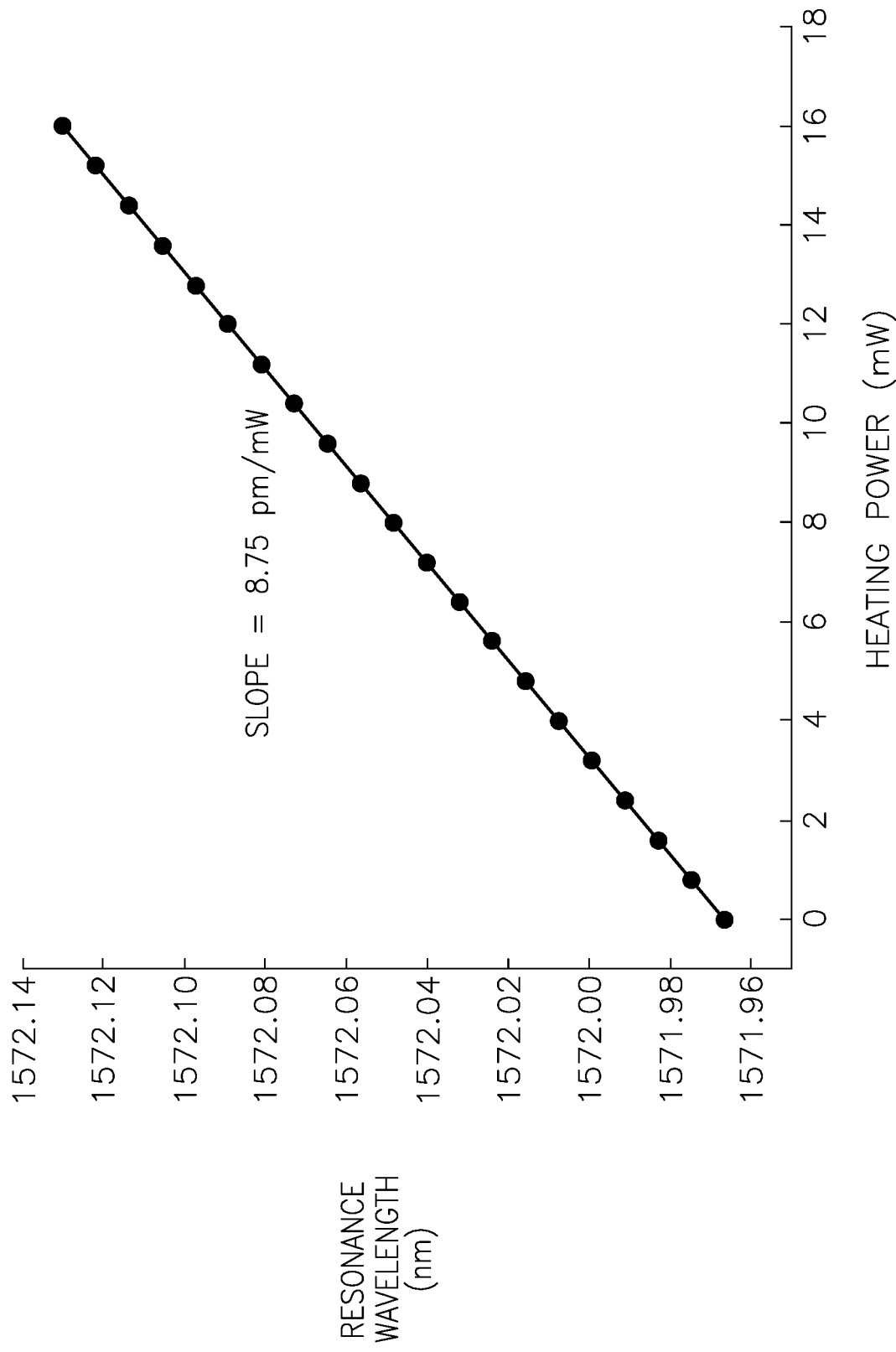
FIG. 6 shows the thermo-optical calibration data of the micro-ring resonator filter and their linear fitting.
Figure 7:
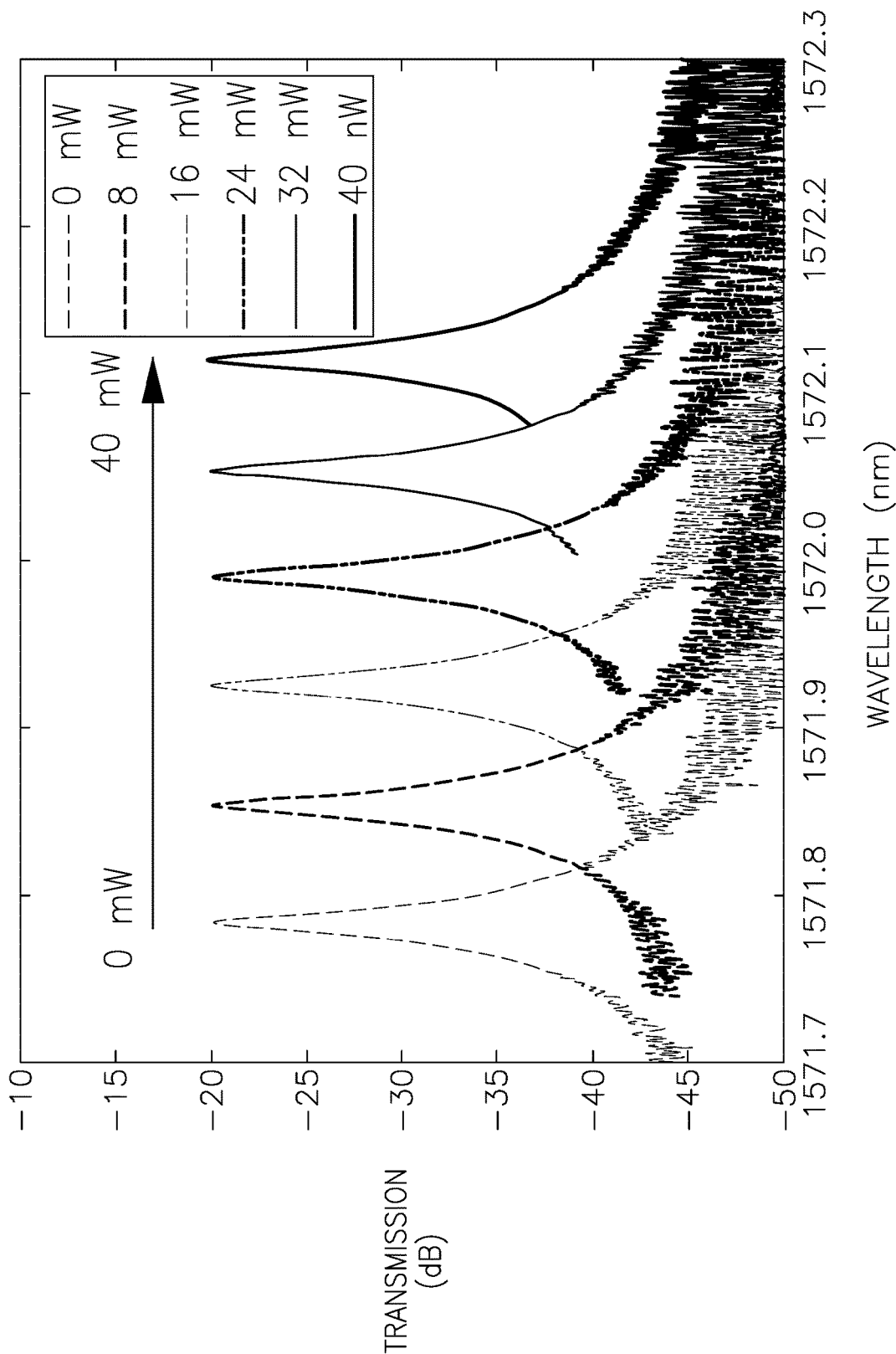
FIG. 7 shows the micro-ring resonator filter transmission shifted by the applied electric power, wherein when the applied electric power on the micro-heater is increased, the filtering optical window is right-shifted. Therefore, the gas absorption spectrum can be measured.

To characterize the tunability of devices made in accordance with the present invention, a current source can be employed, along with a pair of electric probes to supply electric power on the microheater via the on-chip platinum electrode pads, as shown in FIG. 5. Finally, the LNOI chip is packaged using UV light exposed epoxy with a high numerical-aperture (NA=0.4) fiber to stabilize the on-off chip coupling. In such a manner, the filter center wavelength is shifted by applying current to change the local temperature of the MRR. FIG. 6 shows the MRR resonance as a function of the applied electric power, ranging from 0 mW to 40 mW. This results in a red shift of 0.45 nm in the transmission spectrum. As shown in FIG. 7, there is a linear relationship between the shift and electric power, with a slope of 8.75 pm/mW. This good linearity facilitates the inventive spectroscopic measurement. The tuning efficiency can be significantly improved to 53.7 pm/mW by etching tranches for improved thermal isolation around the MRR.

In some embodiments, the relationship is not linear, in which case a lookup table may be generated during the device calibration to obtain the shift for a given electric power.

In some embodiments, the cavity resonance shift is realized by electro-optical effects, wherein the filter center wavelength is shifted by applying a voltage to change the refractive index of the MRR material, and thus the cavity resonance. Compared with the thermo-optical effect, the electro-optical tuning can achieve higher speed, such as a full spectrum sweeping over a nanosecond or less. However, it only applies to MRR materials having adequate electro-optical responses, such as lithium niobate.

Figure 8:
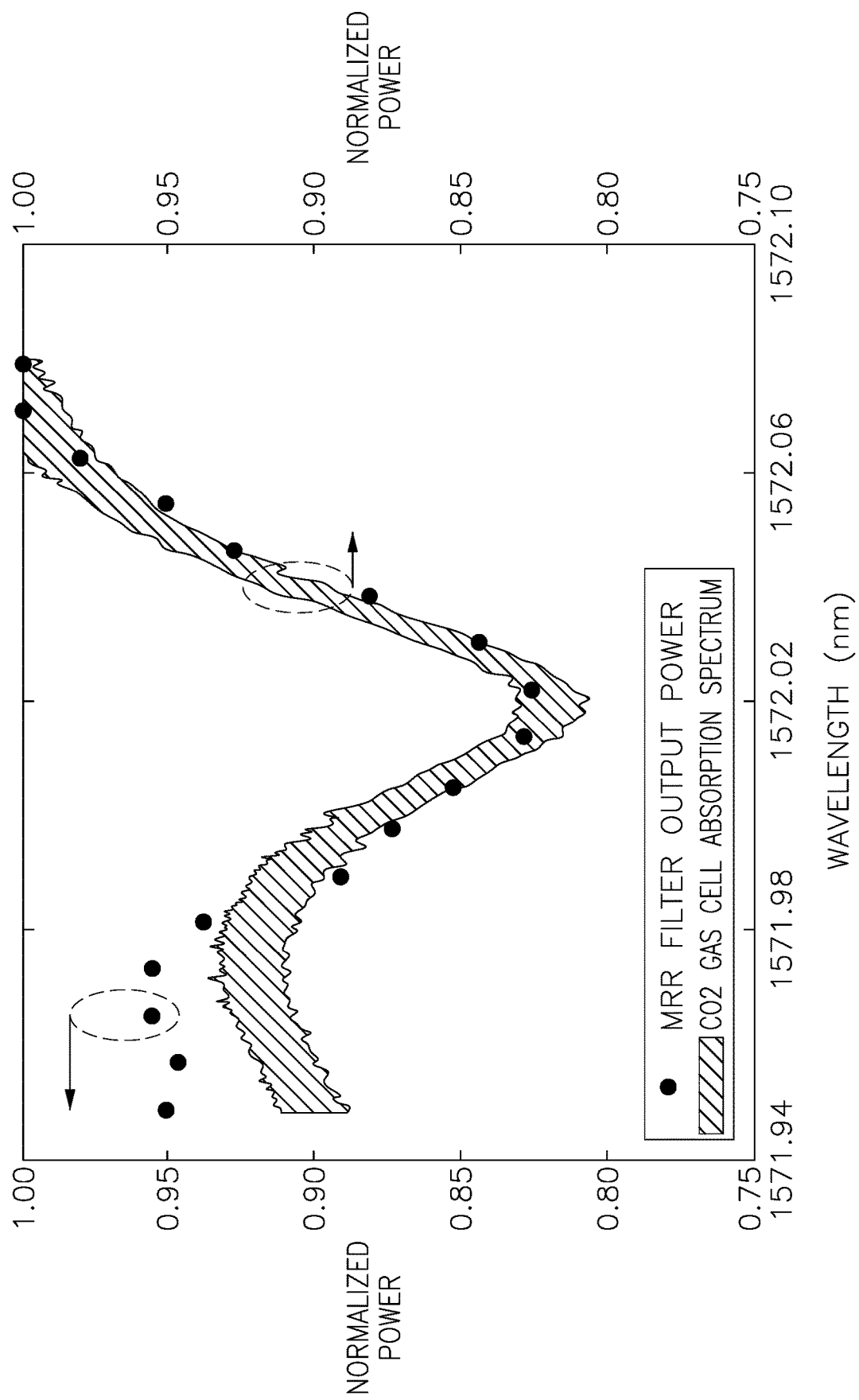
FIG. 8 shows the absorption spectra of a CO2 gas cell measured using the MRR filter and by laser transmission, respectively, wherein the orange curve is the CO2 absorption spectrum measured with ultra-high-resolution sweeping-laser, and the blue points are the measured optical power with MRR filter in corresponding wavelengths.

To calibrate the performance of the filter, the filter can be operated against a $CO_2$ gas cell and compared to direct laser transmission, as shown in FIG. 8. Then, the filter may be applied to measure the spectrum of sunlight passing through the atmosphere, near the absorption line of the atmospheric gas around a specific absorption spectrum line-shape. By differentiating the registered photon counts from those simultaneously recorded in an adjacent bypass channel, an infrared absorption line shape can be acquired with high resolution and accuracy amid the imperfections in sunlight couplings, and without the aid of adaptive optics (see FIG. 10). To minimize the interference of other optical effects in the measurement results, the bypass channel is to be chosen close to the targeted absorption line. In some embodiments, the center spectrum of the bypass channel is 1 nm or less away from the absorption line.

Figure 9:
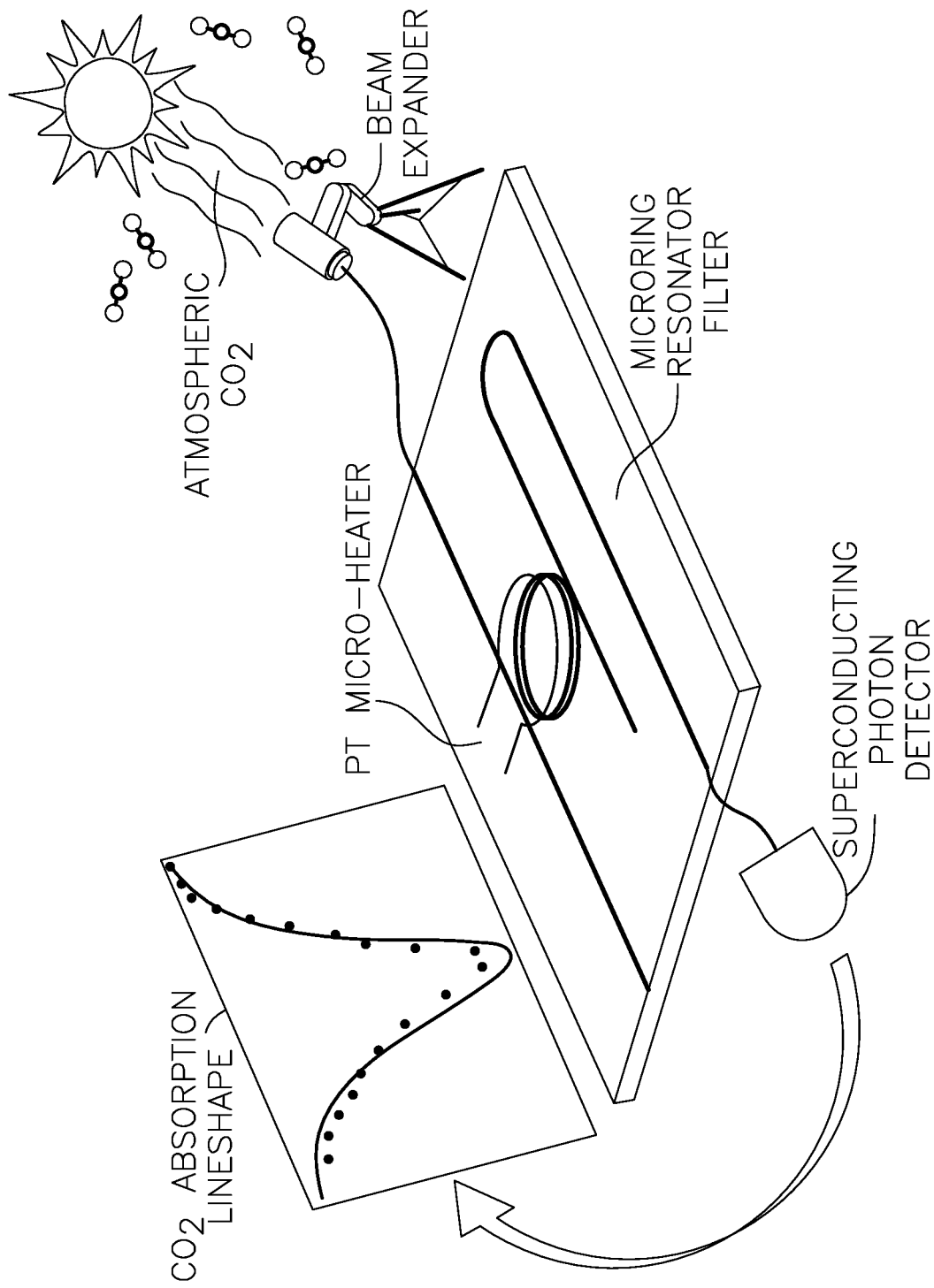
FIG. 9 shows an illustration of the atmospheric CO2 absorption spectroscopy with solar photon counting and LNOI Micro-ring resonator filter.

FIG. 9 illustrates an exemplary experimental setup, wherein the sunlight is captured using a beam expander into a single-mode fiber via a fiber collimation lens (F280FC-1550), coupled onto an integrated MRR filter, and used with a cryogenically cooled superconducting nanowire single-photon detector (i.e., SNSPD; 4 channels SNSPDs, ID281, ID Quantique) for photon counting. Not shown in this figure is a reference channel that simultaneously detects photons at a close-by wavelength as needed to account for the atmosphere dynamics and variations in the coupling collection.

Figure 13:
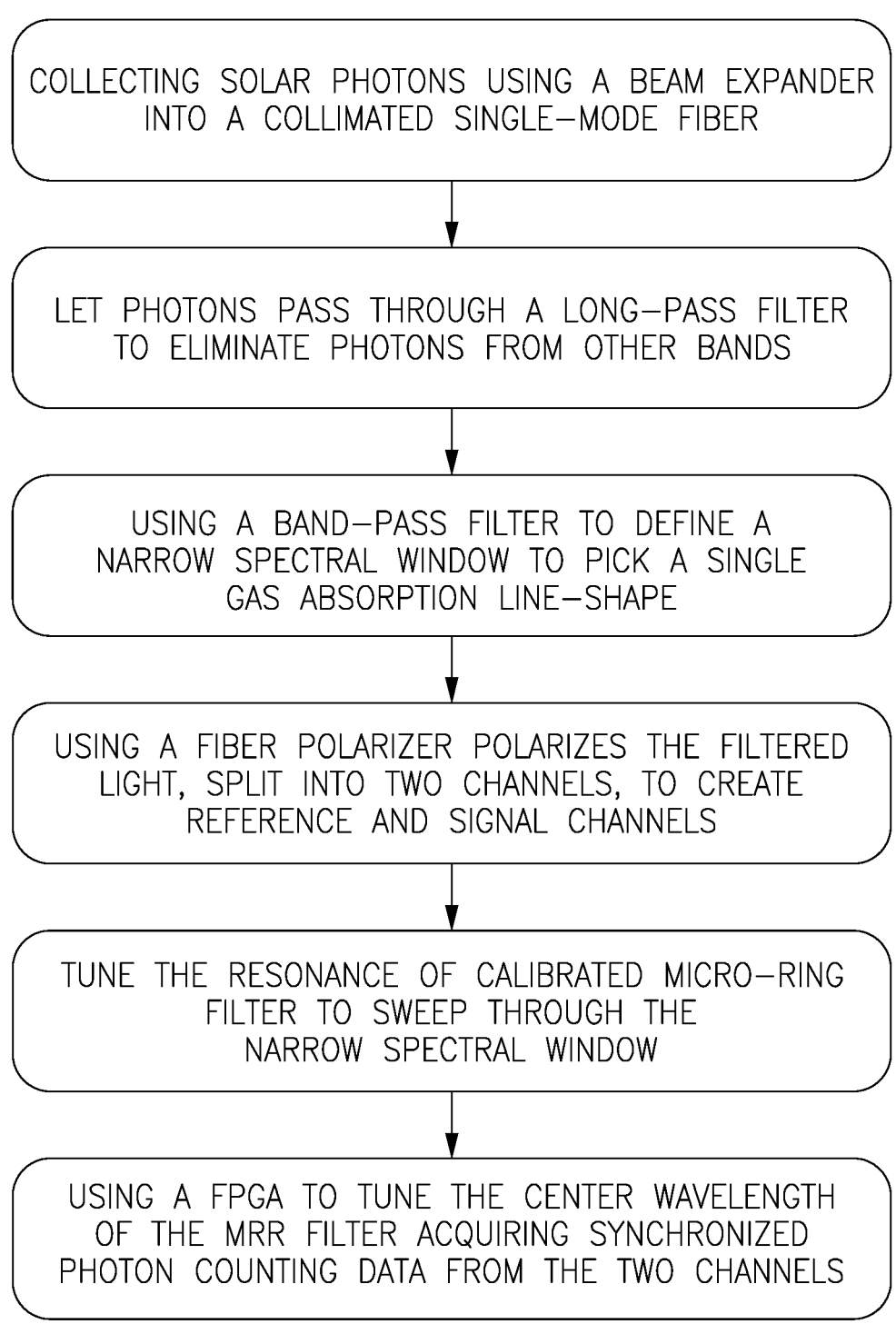
FIG. 13 is a flow diagram illustrating a method of using devices made in accordance with an embodiment of the present invention.

FIG. 9 also illustrates an innovative passive spectroscope comprising an external multi-channel single photon detector and a chip integrated filter using an add-drop micro-ring resonator etched on lithium niobate on insulator. In this example, the filter's linewidth is only 6 pm, with its center wavelength rapidly swept by applying a bias voltage to shift the MRR's resonance. To test the system's performance, its operation was first verified with a CO2 gas cell by comparing it to a direct laser transmission measurement. Then, it was applied to measure the spectrum of sunlight passing through the atmosphere, near the absorption line of the $CO_2$ gas around 1572.02 nm. By differentiating the registered photon counts from those simultaneously recorded in an adjacent bypass channel, the infrared absorption spectrum can be acquired with high resolution and accuracy amid the imperfections in sunlight couplings and dynamic atmospheric conditions without the aid of adaptive optics. A general outline of this process can be seen in FIG. 13.

Example 1 Atmospheric CO2 Absorption Measurement with Solar Photon Counting

Figure 14:
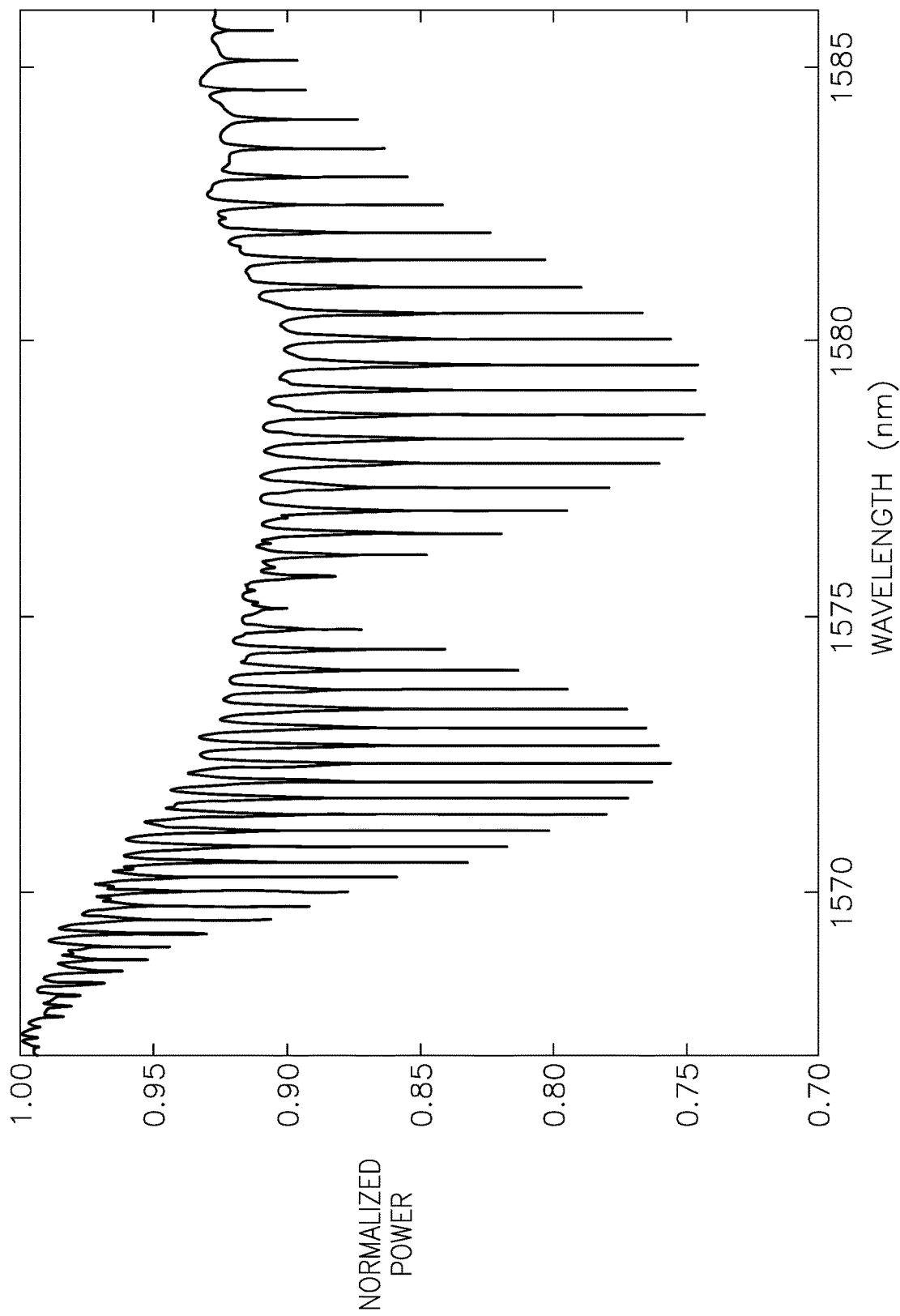
FIG. 14 is a plot showing the extended gas cell absorption spectrum from 1568 to 1585 nm in connection with an embodiment of the present invention.

The MRR filter was first calibrated against the CO2 gas cell (pressure: 740 Torr, path length: 80 cm). The absorption spectrum between 1568 and 1585 nm was measured using the tunable laser, with the result shown in FIG. 14. Out of many absorption peaks, a Lorentzian-shape line at 1572.02 nm was chosen by using a bandpass filter to define a 60.3 nm spectral window. To characterize the MRR, electric current was applied to the Pt micro-heater from an external power supply (GPD-4303S, Instek), whose power is increased from 24 to 38.4 mW at a 0.8 mW interval. It red shifts the filter's center wavelength from 1571.95 to 1572.1 nm at an 8 pm step size. A broadband source from amplified spontaneous emission (ASE) was passed through the gas cell, filtered by the MRR filter, and detected using an optical power meter. The recorded power as the MRR is red-shifted is shown in FIG. 8, which resolves the CO2 absorption around 1572.02 nm. The extinction ratio is 0.83. As a comparison, the laser transmittance through the same optical path is also plotted in the same figure, showing good agreement.

Figure 15:
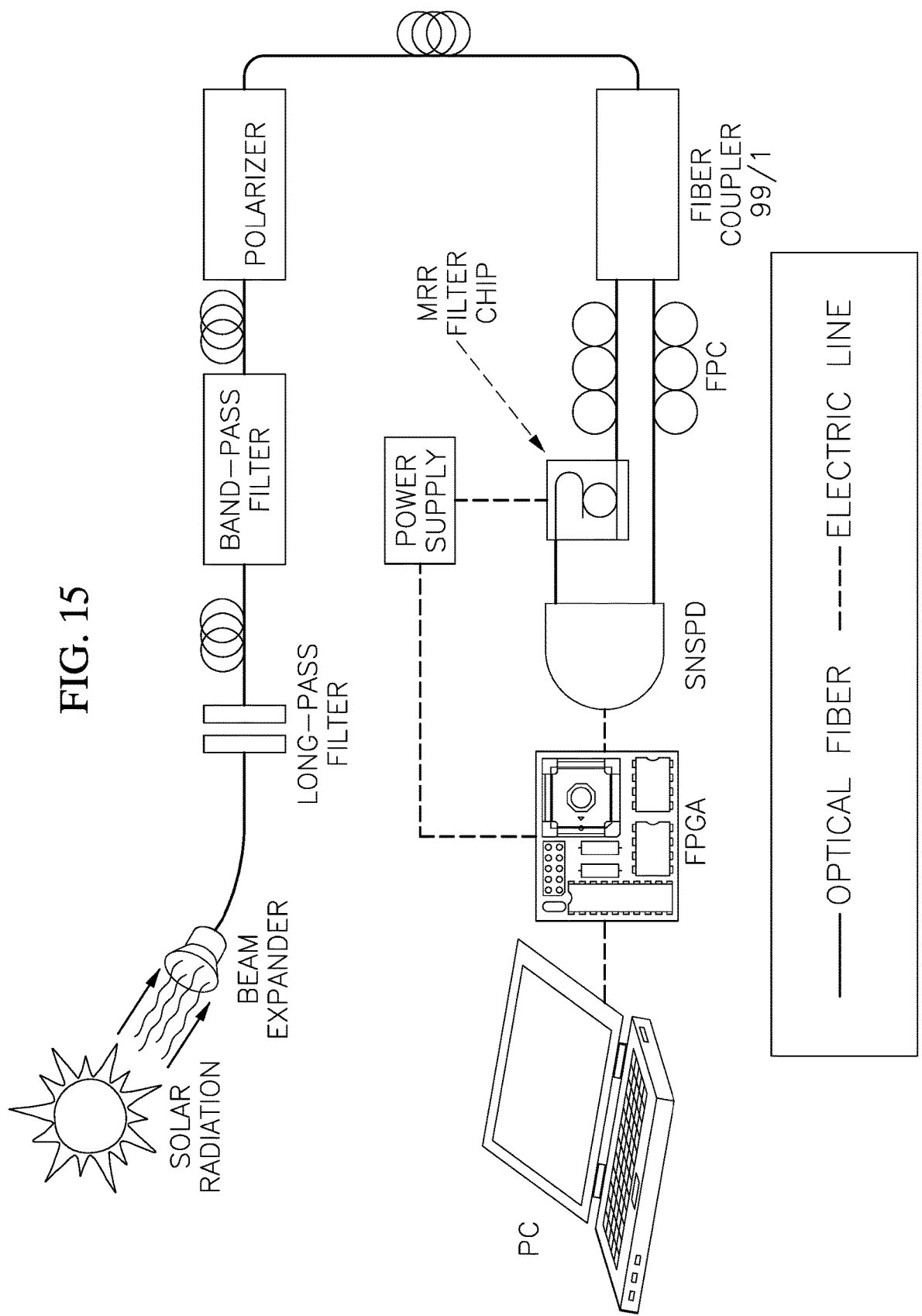
FIG. 15 is an experimental setup for atmospheric $CO_2$ absorption measurement with solar photon counting, in accordance with an embodiment of the present invention.

To measure the atmospheric CO2 absorption, the experimental setup outlined in FIG. 15 can be used. It includes a free-space to fiber beam reducer (Thorlabs-GBE10-C) to collect the solar radiation into a multi-mode fiber (50-μm diameter) that is spliced to a single-mode fiber with 2 to 3 dB loss. A long-pass filter (cut off wavelength: 1200 nm) is used to eliminate sunlight's visible spectrum from saturating the SNSPD. Another bandpass filter is used to further reduce the transmitted solar radiation to a 60.3 nm spectral window centered at 1572.02 nm. After a fiber polarizer, the filtered light is split into two channels with a 99:1 coupler, with 99% of the light coupled into the MRR filter on the LNOI chip and the remaining 1% directly into the reference channel of SNSPD. This configuration allows for the photon count variation to be accounted in real-time due to the fluctuations in the fiber coupling and the dynamic atmosphere attenuation induced by, for example, cloud coverage. The MRR filter's output is fiber coupled into the signal channel of SNSPD to count the photon numbers while the filter is swept from 1571.95 to 1572.1 nm. Finally, a field-programmable-gate-array (FPGA, Zynq-7000, Xilinx) is employed as the central processor for (i) tuning the center wavelength of the MRR filter by varying the electric power on the Pt micro-heater and (ii) acquiring synchronized photon counting data from the two SNSPD channels. Table I lists the parameters of each part of the system.

The integration time for each photon counting is 125 ms in the example system, rendering the total data acquisition time around 3 s. Here, adequate integration time is needed to attain statistical significance by suppressing the Poissonian noise with single-photon counts. This ensures the signal-to-noise ratio (SNR), $N_{solar}/\sqrt{N_{solar}+N_{DC}}$ to be greater than 145 across all data points. Here, $N_{solar}$ is the registered photon counts in the signal channel. In contrast, $N_{DC}$ is the total noise count of the entire detection system, measured by disconnecting the optical fiber from the beam expander. As shown in the table of FIG. 15, $N_{DC}$ fluctuates between 9.6 and 16 kHz, much higher than the detector dark count rates (300 Hz). This phenomenon is due to the coupling fiber's thermal photons from the MRR and single-photon detector. Hence, further noise reduction is achievable by shortening the connecting optical fiber in a compact experiment setup. A shorter integration time is needed to achieve the same SNR with a lower noise level or reduced insertion loss of the MRR filter. With the thermal-optical tuning, the shortest thermo-optic response time is 60 μs. An even shorter time is possible by using electro-optical tuning.

Figure 10:
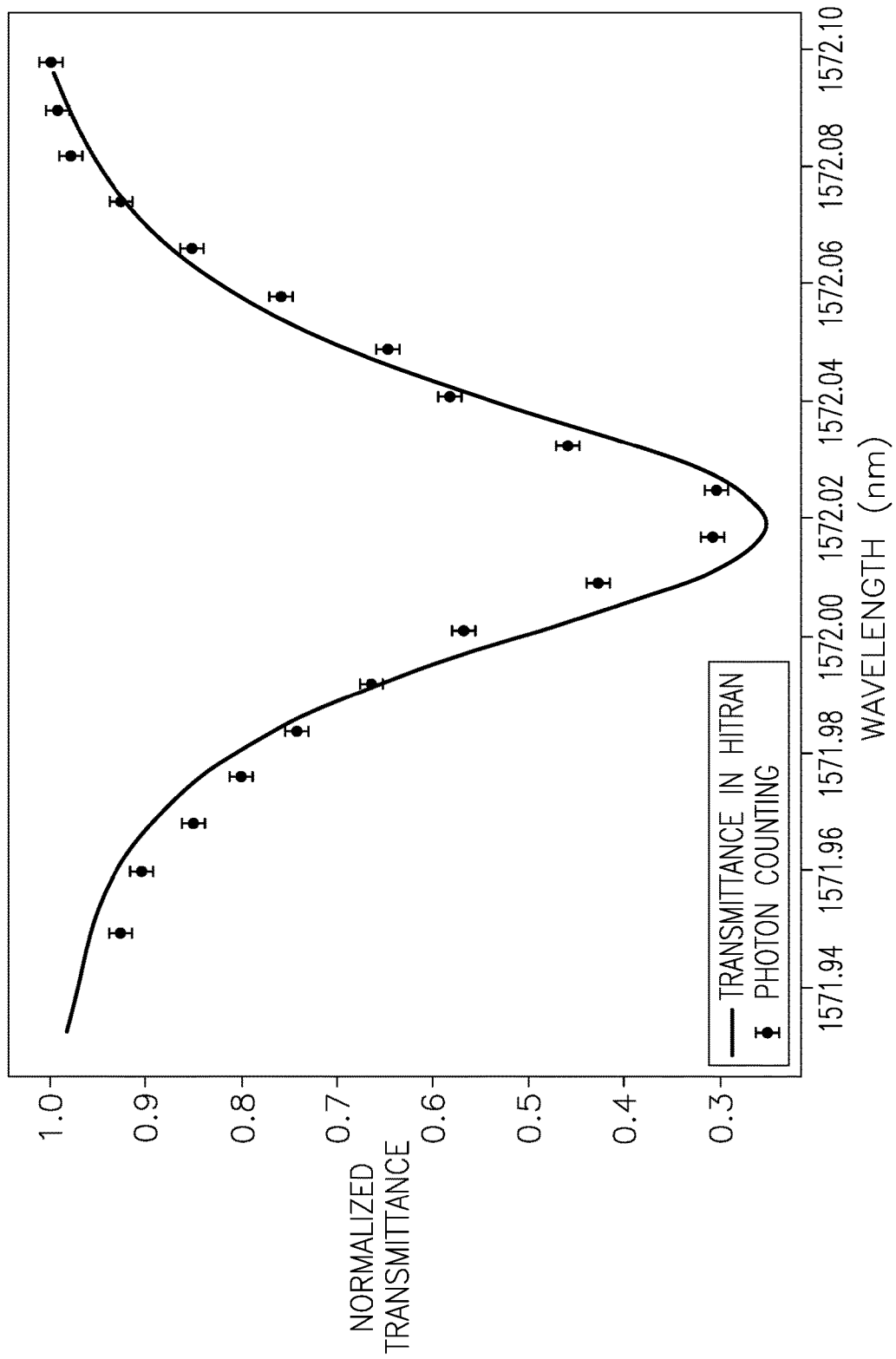
FIG. 10 shows the solar photon counts through the atmosphere around the gas absorption spectrum line and the transmittance spectrum from the HITRAN database (high-resolution transmission molecular absorption database)

To retrieve the atmospheric CO2 absorption spectrum, the normalized photon counts, corrected with the reference channel were plotted, as the MRR resonance is tuned. The result is shown in FIG. 10 along with the calculated dry-air CO2 absorption spectrum from the HITRAN 2016 (high-resolution transmission molecular absorption database, temperature: 296 k, pressure: 1 atm). An excellent agreement is seen, both on the absorption linewidth and depth. Specifically the measured FWHM is about 49 pm, compared with 52 pm as extracted from the HITRAN database. This small discrepancy is within the error caused by the 6 pm resolution of the MRR filter. The depth extinction is 0.26 by fitting the measurement results with a Lorentzian function, which agrees with the HITRAN database value of 0.25, too. With the current ground-based measurement system, the CO2 concentration can be calculated from the differential photon counts proportional to atmospheric CO2 concentration, as $$N_{diff}=N_{off}-N_{on} \qquad (1)$$

With $N_{off(on)}$ being the off (on) CO2 absorption line photon count. The uncertainty of $N_{diff}$ due to shot noise is $$\Delta N_{diff}=\sqrt{N_{off}-N_{on}} \qquad (2)$$

which limits the atmospheric CO2 concentration variation detection sensitivity to be $\Delta N_{diff}=\sqrt{N_{off}-N_{on}} \times 412$ ppm=1:2 ppm (parts per million), about 30 times better than a typical photon-counting IPDA lidar. Note that the CO2 detection sensitivity of the current system can be improved significantly by reducing the system dark count and coupling efficiency of solar photons.

Benefiting from the high efficiency and low dark count level of the SNSPD, only a few tens of thousands of photons per spectral point need to be counted for a precise absorption with high SNR. This photon receiving level ensures that the SNSPD operates in the linear counting regime for accurate and bias-free spectroscopic measurement. It also relaxes the requirement for high-end signal collection apparatuses, like a telescope with a wide aperture and adaptive optics for enhanced coupling. Furthermore, a commercial SNSPD with active quenching can already operate in the counting regime up to a few tens of MHz with high linearity Therefore, real-time, dynamic monitoring of the atmospheric CO2 concentration can be realized by using dual MRR filters on a single nanophotonic chip, with one tuned into the absorption line (i.e., on-line) and the other off (i.e., off-line) while recording the ratio of their photon counts using SNSPD. This approach is similar to the IPDA lidar but without restriction in laser wavelength. Moreover, monitoring and spectroscopic measurement of multi-species of gases are possible by leveraging the photonics chip's scalability and broadband nature of solar radiation.

In this experiment, the free spectral range (FSR) of the MRR filter is about 2 nm. Its small volume allows it to rapidly scan the transmission line at high efficiency. The external long-pass filter is inserted to prevent solar photons from saturating the signal photon-sensitive SNSPD, while the external bandpass filter is employed to eliminate mode-order ambiguity beyond a FSR. In the future, those external filters can potentially be integrated on the same chip, by using array waveguide gratings (AWGs) long-pass filters, and cascaded microring resonators. Also prospective is the integration of SNSPDs on the same chip, for which NbN SNSPDs have been recently demonstrated on thin-film lithium niobate. By these advances, the presently demonstrated technique could lead to impactful applications in multiple areas of remote sensing.

By single-photon counting and using a narrow-band filter made of an integrated, fast swept MRR on LNOI, a high-resolution measurement of the CO2 absorption spectrum is demonstrated. Thanks to the ultralow system noise, only several tens of thousands of photon counts were needed per spectral point to retrieve the fine line shape of the atmospheric CO2 vibrational-rotational band around 1572.02 nm. These results show that the LNOI-based integrated photonics and single-photon detection combined promise photon-efficient remote sensing. By using photonic lantern for light collection from the telescope into the single-mode devices on LNOI chips with wide transparency window, the present technique may find a breadth of applications in satellite remote sensing, monitoring solar-induced fluorescence, and exoplanet remote sensing.

Further features, details and embodiments of the present invention can be found in the publication by Jiuyi Zhang et al. entitled "Carbon-Dioxide Absorption Spectroscopy with Solar Photon Counting and Integrated Lithium Niobate Micro-Ring Resonator," Applied Physics Letters 118 (2021), 171103, the entire contents of which are incorporated herein by reference and made a part of the present Specification for all purposes.

In some embodiments, instead of measuring solar photons, the disclosed systems and their variants or derivatives are used for remote measurements of Raman spectroscopy, fluorescent spectroscopy, and Brillouin scattering. In those applications, the targets of interest are illuminated by narrowband lasers, and the generated photons at a wavelength shifted from that of the lasers are collected and their spectral properties are measured by using the disclosed systems.

It will be understood that the embodiments described herein and in the incorporated paper are merely exemplary and that a person skilled in the art may make many variations and modifications without departing from the spirit and scope of the invention. All such variations and modifications are intended to be included within the scope of the invention.

The invention claimed is:

1. A method for single-photon spectroscopy, comprising the steps of:
   collecting photons using a beam expander into a collimated single-mode fiber;
   letting said photons pass through a long-pass filter to create long-pass filtered photons and to eliminate photons from other bands;
   filtering said long-pass filtered photons with a band-pass filter to define a spectral window adapted to pick a single gas absorption line-shape and obtain filtered light;
   utilizing a fiber polarizer to select said filtered light along a certain polarization, thereby producing filtered and polarized light;
   splitting said filtered and polarized light into a first portion of light and a second portion of light;
   routing said first portion of light through a signal photon counting channel comprising a calibrated micro-ring resonator filter and a field-programmable-gate-array;
   tuning the resonance of said micro-ring resonator filter to sweep through said spectral window;
   using said field-programmable-gate-array to tune a center wavelength of said micro-ring resonator filter;
   acquiring first photon counting data from said signal photon counting channel following the performance of said tuning and using steps;
   directly after the performance of said splitting step, coupling said second portion of light into a bypass photon counting channel;
   detecting photons at a close-by wavelength in said bypass photon counting channel, said close-by wavelength having a center spectrum 1 nm or less away from said center wavelength of said single gas absorption line-shape, thereby obtaining second photon counting data; and
   producing synchronized photon counting data from said first photon counting data and said second photon counting data.

2. The method of claim 1, wherein said collecting step is performed on solar photons.

3. The method of claim 1, wherein said collecting step is performed on photons created by a laser source illuminating on a target through Raman scattering, fluorescence, or Brillouin scattering optical processes.

4. The method of claim 1, wherein said micro-ring resonator filter is an add-drop micro-ring resonator etched on lithium niobate on insulator.

5. The method of claim 4, wherein said micro-ring resonator filter includes an integrated metal heater.

6. The method of claim 1, wherein said splitting step is performed with a 99:1 coupler.

7. The method of claim 1, wherein said acquiring step is conducted simultaneously with said detecting step.

8. The method of claim 1, wherein said spectral window is adequately narrow to measure absorption with high resolution during said tuning step.

9. The method of claim 1, wherein said single gas absorption line shape corresponds to $CO_2$.

* * * * *